United States Patent
Sangudi et al.

(10) Patent No.: US 12,353,393 B2
(45) Date of Patent: Jul. 8, 2025

(54) TIME-SERIES DATABASE FOR STORING AND INDEXING EVENTS AND METRICS

(71) Applicant: ServiceNow, Inc., Santa Clara, CA (US)

(72) Inventors: Gerald Sangudi, Framingham, MA (US); Raymond Lau, Charlestown, MA (US); Timothy Smith, Sudbury, MA (US); Donghang Lin, Kirkland, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/374,552

(22) Filed: Sep. 28, 2023

(65) Prior Publication Data

US 2025/0110941 A1    Apr. 3, 2025

(51) Int. Cl.
*G06F 7/00* (2006.01)
*G06F 16/22* (2019.01)
*G06F 16/23* (2019.01)
*G06F 16/2453* (2019.01)

(52) U.S. Cl.
CPC ...... *G06F 16/2291* (2019.01); *G06F 16/2379* (2019.01); *G06F 16/24549* (2019.01)

(58) Field of Classification Search
CPC ............. G06F 16/2291; G06F 16/2379; G06F 16/24549
See application file for complete search history.

(56) References Cited

U.S. PATENT DOCUMENTS

| | | | | |
|---|---|---|---|---|
| 9,754,395 B2* | 9/2017 | Fletcher | | G06T 11/206 |
| 11,551,421 B1* | 1/2023 | Bhushan | | G06T 19/20 |
| 12,062,234 B1* | 8/2024 | Bhushan | | G06F 16/955 |
| 2006/0265302 A1* | 11/2006 | Schmalenberger | | G06Q 40/00 |
| | | | | 705/35 |
| 2007/0214132 A1* | 9/2007 | Grubb | | G06Q 30/0277 |
| | | | | 707/999.005 |
| 2011/0022212 A1* | 1/2011 | Nonaka | | G05B 19/4184 |
| | | | | 700/108 |
| 2012/0197898 A1* | 8/2012 | Pandey | | H04L 67/12 |
| | | | | 707/741 |
| 2013/0159832 A1* | 6/2013 | Ingargiola | | G06Q 40/00 |
| | | | | 715/220 |
| 2014/0149466 A1* | 5/2014 | Sato | | G06F 11/3013 |
| | | | | 707/803 |
| 2015/0038854 A1* | 2/2015 | Zhang | | A61B 5/0082 |
| | | | | 600/479 |
| 2015/0295796 A1* | 10/2015 | Hsiao | | H04L 41/0813 |
| | | | | 715/738 |
| 2016/0224660 A1* | 8/2016 | Munk | | G06F 16/316 |
| 2016/0292233 A1* | 10/2016 | Wilkinson | | G06F 16/215 |
| 2016/0321352 A1* | 11/2016 | Patel | | G06F 16/328 |

(Continued)

*Primary Examiner* — Mohammed R Uddin
(74) *Attorney, Agent, or Firm* — McDonnell Boehnen Hulbert & Berghoff LLP (57) ABSTRACT

In the present application, a system and method for storing and retrieving time-series data in a time-series database are disclosed. A data stream collected at a periodic collection time interval is stored. The stored data stream is indexed in an index, including by storing in the index a representative index entry corresponding to a plurality of data elements of the stored data stream collected during a period of time longer than the periodic collection time interval of the data stream.

19 Claims, 5 Drawing Sheets

(56) References Cited

U.S. PATENT DOCUMENTS

| | | | |
|---|---|---|---|
| 2017/0228405 A1* | 8/2017 | Ward | G06F 16/2474 |
| 2018/0089306 A1* | 3/2018 | Pal | G06F 16/24535 |
| 2020/0093438 A1* | 3/2020 | Zhang | A61B 5/7267 |
| 2020/0225654 A1* | 7/2020 | Vitullo | G05B 23/0235 |
| 2020/0239162 A1* | 7/2020 | Saito | G01M 5/0033 |
| 2020/0333767 A1* | 10/2020 | Engelstein | H04Q 9/00 |
| 2020/0334254 A1* | 10/2020 | Arye | G06F 16/2393 |
| 2020/0356462 A1* | 11/2020 | Anand | G06F 11/3495 |
| 2021/0232580 A1* | 7/2021 | Pfeifer | G06F 16/2477 |
| 2021/0406317 A1* | 12/2021 | Beedgen | G06F 11/3476 |
| 2024/0273630 A1* | 8/2024 | Fujimura | G06Q 40/04 |

* cited by examiner

FIG. 5 ns, but the invention is not limited to any embodiment.
TIME-SERIES DATABASE FOR STORING AND INDEXING EVENTS AND METRICS

BACKGROUND OF THE INVENTION

A time-series is a series of data points in time order. The data points are measurements with timestamps. Time-series data includes data points recorded or measured over a series of discrete time intervals. Time-series data may be used in various fields, including finance, IoT (Internet of Things), monitoring systems, and scientific research. Examples of time-series data include weather records, economic indicators, patient health evolution metrics, server metrics, application performance monitoring metrics, network data, sensor data, events, clicks, and many other types of analytics data.

A time-series database (TSDB) is a specialized software system designed to efficiently store, manage, and retrieve time-series data. Time-series databases are valuable tools for organizations and applications that need to analyze and derive insights from time-ordered data, as they provide efficient and scalable storage and querying solutions tailored to this specific data format.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A traditional time-series database may be used to store time-series data that is sampled at regular intervals. For example, a time-series database may be used to help developers working with IoT-based applications that monitor or act on large amounts of machine-generated data.

Figure 1:
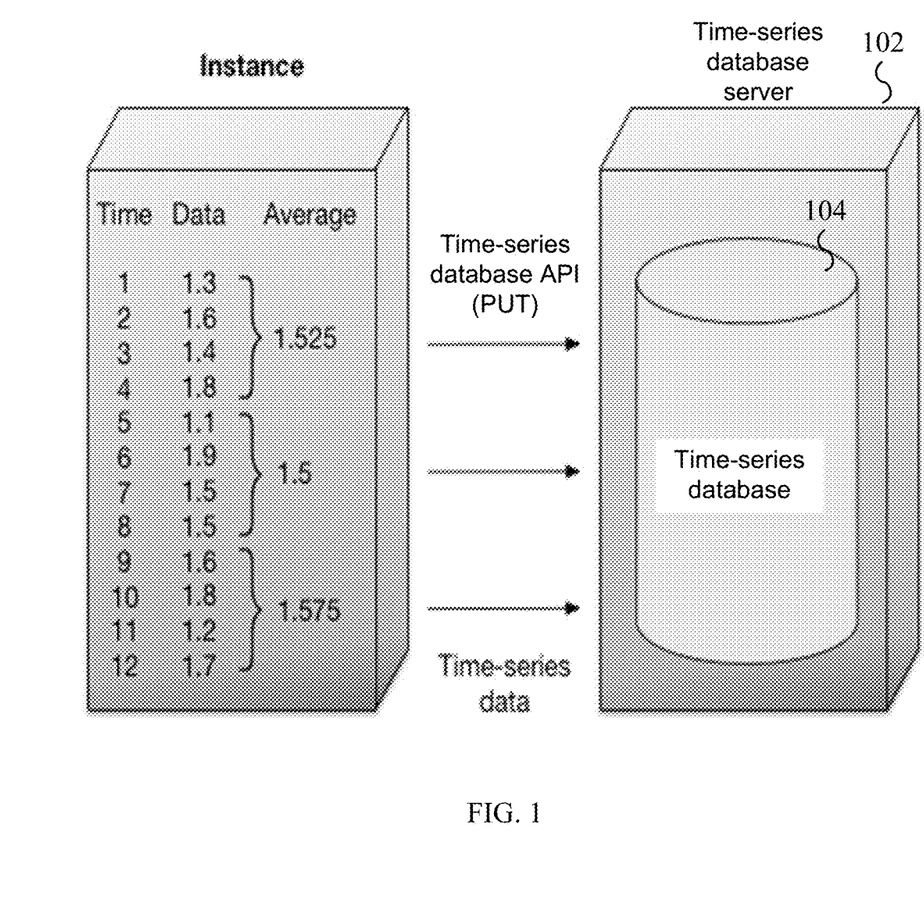
FIG. 1 shows that machine-generated data may be sampled periodically and an aggregate of the values in each sampling period may be stored in a time-series database 104 of a time-series database server 102 until the data's expiration date.

The time-series database may be used to handle large amounts of data by using a smaller summary of that data that is stored in the time-series database. For example, an instance might store data related to the central processing unit (CPU) usage of a computer. The data may be summarized by storing the average CPU usage for every five-minute interval. FIG. 1 shows that machine-generated data may be sampled periodically and an aggregate of the values in each sampling period may be stored in a time-series database 104 of a time-series database server 102 until the data's expiration date. The aggregate of values may be an average, a maximum, or a minimum, for example. For example, the machine-generated data that is stored on an instance may be sampled once every five minutes. This sampling rate is called the time-series definition. A time-series database application programming interface (API) may be used to send data from the instance to time-series database 104 at the rate that is prescribed by the time-series definition.

A time-series database may be used in different use cases. In one example, it may be used to create graphs about metrics, such as about CPU usage over time. In another example, it may be used to generate an email if the average CPU usage is more than a certain percentage in the last predetermined time period. In another example, it may be used to train a machine language model to detect anomalies and trigger a response when an anomaly is detected. In another example, it may be used to generate an email if a gap is detected in the submitted data. In another example, it may be used to generate an alert if the average of the collected data is outside a predetermined range. In yet another example, it may be used to generate an alert if memory usage is likely to exceed 90% in the next 10 minutes.

In a time-series database, an index is a data structure that facilitates efficient and fast retrieval of data points based on one or more conditions. The terms "data points" and "data elements" are herein used interchangeably. Indexing helps optimize queries to quickly locate relevant data. An index identifies or points to a location in the main storage where relevant data may be obtained. There are many types of indexing for time-series databases. As an example, in timestamp-based indexing, time-series databases use timestamp-based indexing to organize data points. Each data point is associated with a timestamp, which represents the time when the data was recorded. The index stores references to these data points and their corresponding timestamps. Efficient indexing is critical for achieving high-performance query capabilities in time-series databases, especially when dealing with large volumes of data.

Search tags in the context of a time-series database refer to metadata or labels that are associated with time-series data points. These tags are used to provide additional context and information about the data, making it easier to organize, query, and analyze time-series data effectively. Search tags are often used as metadata attributes that describe the data points that include measurements with timestamps. These metadata attributes can include information such as the source of the data, location, device ID, sensor type, and more. Tags help in categorizing and identifying data points based on their attributes. Search tags make it easy to filter and query time-series data based on specific criteria. For example, one may query all data points generated by a particular sensor, within a specific geographical area, during a specific time range.

In the present application, a system and method for storing and retrieving time-series data in a time-series database are disclosed. A data stream collected at a periodic collection time interval is stored. The stored data stream is indexed in an index, including by storing in the index a representative index entry corresponding to a plurality of data elements of the stored data stream collected during a period of time longer than the periodic collection time interval of the data stream.

In the present application, an improved time-series database with added searchability via searchable tags is disclosed. In some embodiments, the searchable tags may be attached to each data element. One challenge is that for each update (which may happen very frequently) to the main storage with a new data element with a timestamp, a corresponding update to the index is required. The updates may happen once per minute for every time-series. In an information technology (IT) management scenario of a large company with tens of thousands of end users, each end user laptop's CPU percentage usage, temperature, etc., would be a separate time-series, each with a high data volume. For example, the time-series data corresponding to the CPU temperature with a timestamp granularity of one minute and the time-series data's corresponding index are both being updated once per minute. Updating the index is a much more expensive operation than writing the time-series data itself, as the data may be stored in a write efficient manner. For example, the time-series data may be stored in a round-robin database (RRD), in which fixed-size records are pre-allocated. A round-robin database is a special type of storage designed to store data in a file or memory-mapped ring buffers. Since the data is stored in a circular buffer-based database, the system storage footprint remains constant over time.

In the present application, a timestamp window is introduced to reduce the amount of index writes, which are expensive operations. In some embodiments, a timestamp window may be a window with a substantially longer duration than a single data element but shorter than the data retention duration, such that slowly changing values of the data series are only updated in the index when the updates span across the timestamp window boundaries. In one example, if a data element is collected every minute and the data retention duration is 30 days, the timestamp window may be set to 30 minutes. In this example, the amount of index writes may be reduced by a factor of 30.

A query via the index may be resolved to only the granularity of the timestamp window duration (i.e., 30 minutes in the above example), which is a coarser granularity than the granularity of the time-series data itself (i.e., 1 minute in the above example). To obtain a finer resolution than the resolution of the timestamp window duration requires further scanning of the time-series data within the timestamp window. In other words, the improved time-series database is trading a higher expense on the searching or reading tasks for a lower expense on the writing tasks. Given that the amount of queries is relatively much lower than the amount of index writes required for maintaining many high-volume time-series, the tradeoff is highly beneficial. Therefore, the improved time-series database techniques have many advantages and benefits. The improved techniques allow efficient indexing of high volume time-series data. The improved techniques achieve greater efficiency by minimizing the amount of updates to the index by an order of magnitude or more compared to techniques that require updating the index for each data element.

Figure 2:
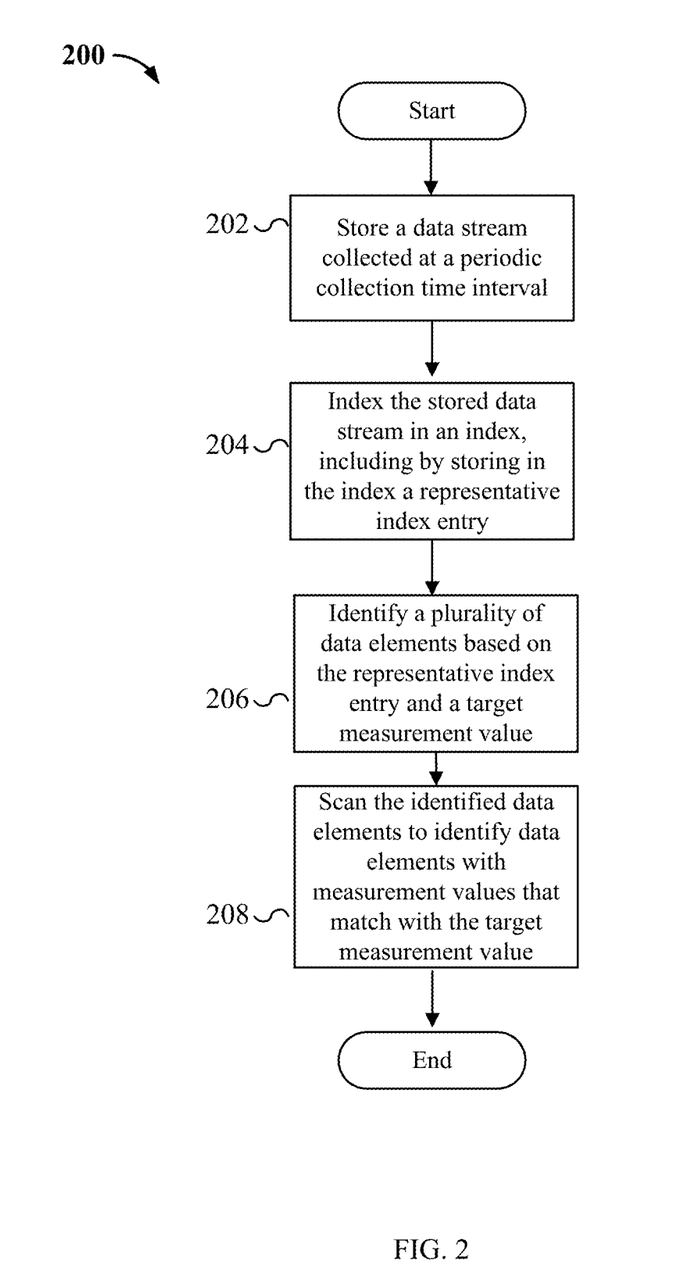
FIG. 2 illustrates an exemplary process 200 for storing and retrieving time-series data in a time-series database.

FIG. 2 illustrates an exemplary process 200 for storing and retrieving time-series data in a time-series database. In some embodiments, process 200 may be performed by time-series database server 102 and time-series database 104.

At step 202, a data stream collected at a periodic collection time interval is stored. The data stream is a time-series data stream. Examples of time-series data include weather records, economic indicators, patient health evolution metrics, server metrics, application performance monitoring metrics, network data, sensor data, events, clicks, and many other types of analytics data. For illustrative purposes only, the example time-series data stream is the data sent from one of a plurality of computers within an enterprise network that may be used to report certain computer information related to the computer, such as the computer "on/off" time, temperature, and the like.

The data stream is collected at a periodic collection time interval, also referred to as a time-series timestamp period. For example, the computer information may be sampled once every minute. The periodic collection time interval of the sampled data points (i.e., sampled data elements) in this example is one minute. Each data element is a single piece of data. Each data element may include one or more measurements or values. For example, the one or more measurements may include a single observation of the computer's "on/off" state, temperature, location, and the like.

The received time-series data stream may be stored in a main storage of the time-series database. For example, the time-series data may be stored in a round-robin database (RRD), in which fixed-size records are pre-allocated. A round-robin database is a special type of storage designed to store data in a file or memory-mapped ring buffers. Since the data is stored in a circular buffer-based database, the system storage footprint remains constant over time. However, other types of databases may be used as well.

At step 204, the stored data stream is indexed in an index, including by storing in the index a representative index entry corresponding to a plurality of data elements of the stored data stream collected during a period of time longer than the periodic collection time interval of the data stream.

In a time-series database, an index is a data structure that facilitates efficient and fast retrieval of time-ordered data points based on one or more conditions. Indexing helps optimize queries to quickly locate relevant data. Indexing the stored data stream enables the index of the stored data stream to identify or point to a location in the stored data stream where relevant data may be obtained. For example, an index may be used to search for a particular value, such as the computer's "on/off" state, temperature, location, and the like. Multiple indexes may be defined for the stored data stream. These enable the administrator of an enterprise to determine different problems, including which specific computers were on, which specific computers were overheated, which specific computers had crashed, which ones were running out of memory, and the like.

To reduce the amount of index writes that are computationally expensive operations, the index does not need to be updated once for each periodic collection time interval. Instead the index is only updated based on a predetermined timestamp window. In some embodiments, the predetermined timestamp window corresponds to a plurality of data elements of the stored data stream collected during a period of time longer than the periodic collection time interval of the data stream. In some embodiments, the predetermined timestamp window may be a window with a substantially longer duration than a single data element but shorter than the data retention duration, such that slowly changing values of the data series are only updated in the index when the updates span across the timestamp window boundaries. In one example, if a data element is collected every minute and the data retention duration is 30 days, the timestamp window may be set to 30 minutes. In this example, the amount of index writes may be reduced by a factor of up to 30.

In some embodiments, updating the index based on the predetermined timestamp window comprises storing in the index a representative index entry corresponding to a plurality of data elements of the stored data stream collected during a period of time longer than the periodic collection time interval of the data stream. The representative index entry enables the searching of a measurement value with a granularity of the predetermined timestamp window.

In one example, a useful search is to find out what times a computer was "on" and what times the computer was "off." Therefore, the index may be one for searching for the computer's on/off state. Continuing with the example that the computer information is sampled once every minute and the timestamp window is 30 minutes, then the data elements of the stored data stream may indicate the following: at the timestamp of 12:00 pm, the computer is "on"; at 12:01 pm, the computer is "on"; at 12:02 pm, the computer is "on"; but at 12:03 pm, the computer is "off," and continues to stay "off" until the end of the timestamp window at 12:30 pm. Since the representative index entry enables the searching of the measurement value with a granularity of the predetermined timestamp window, a search will not be able to locate an exact data element in which the computer was "on" or "off." Instead, the representative index entry may only determine that the computer was "on" at some time between 12:00 pm and 12:30 pm when the predetermined timestamp window is from 12:00 pm to 12:30 pm. In this example, instead of updating the index 30 times, the index may be updated two times, one for "on" and one for "off" within the 30 minute timestamp window. Therefore, the index update load is reduced by a factor of up to 30. In this example, the representative index entry would also determine that the computer was "off" at some time between 12:00 pm and 12:30 pm.

At step 206, the plurality of the data elements of the stored data stream collected during the period of time longer than the periodic collection time interval of the data stream is identified based at least in part on the representative index entry and a target measurement value. In some embodiments, the above identification may be based at least in part on the representative index entry and one or more of the following: a target measurement value, a range of measurement values, or an attribute.

Continuing with the above example, the representative index entry may only determine that the computer has the target measurement value of "on" at some time between 12:00 pm and 12:30 pm when the predetermined timestamp window is from 12:00 pm to 12:30 pm. With a target measurement value of "on," the representative index entry may indicate the plurality of data elements in the stored data stream, including the data element with the timestamp 12:00 pm, the data element with the timestamp 12:01 pm, and up until the last data element with the timestamp 12:30 pm.

At step 208, the plurality of the data elements of the stored data stream collected during the period of time longer than the periodic collection time interval of the data stream is scanned to identify one or more data elements that match one or more of the following: the target measurement value, the range of measurement values, or the attribute.

Continuing with the above example, each of the identified data elements with timestamps from 12:00 pm to 12:30 pm (with one minute increments) obtained from step 206 are scanned to identify the data elements that have the target measurement value of "on." The identified data elements in this example include the data element with the timestamp of 12:00 pm, the data element with the timestamp at 12:01 pm, and the data element with the timestamp at 12:02 pm. As shown, to obtain a finer resolution than the resolution of the timestamp window duration requires further scanning of the time-series data within the timestamp window.

In some embodiments, additional improved techniques allow efficient indexing of high volume time-series data by tracking the minimum and maximum values of the time-series data. To reduce the amount of index writes that are computationally expensive operations, the index does not need to be updated once for each periodic collection time interval. Instead, the index is only updated based on a predetermined time window of interest. In some embodiments, a window of interest may be a window with a substantially longer duration than a single data element. In one example, if a data element is collected every minute, the window of interest may be set to 30 minutes. The index stores only the minimum and maximum measurements within the time window of interest. For illustrative purposes only, the example time-series data stream is the data sent from one of a plurality of computers within an enterprise network to report the computer's CPU temperature. Since the CPU temperature may fluctuate within a period of time, the index may store, for each computer, the minimum CPU temperature and the maximum CPU temperature within each time window. The index is updated when a new minimum or a new maximum CPU temperature occurs in the time-series data.

A query via the index may be resolved to only the granularity of the window of interest (i.e., 30 minutes in the above example), which is a coarser granularity than the granularity of the time-series data itself (i.e., 1 minute in the above example). To obtain a finer resolution than the resolution of the window of interest requires further scanning of the time-series data within the window of interest. In other words, the improved time-series database is trading a higher expense on the searching or reading tasks for a lower expense on the writing tasks. Given that the amount of queries is relatively much lower than the amount of index writes required for maintaining many high-volume time-series, the tradeoff is highly beneficial. Therefore, the improved time-series database techniques have many advantages and benefits. The improved techniques allow efficient indexing of high volume time-series data. The improved techniques achieve greater efficiency by minimizing the amount of updates to the index by an order of magnitude or more compared to techniques that require updating the index for each data element.

Figure 3:
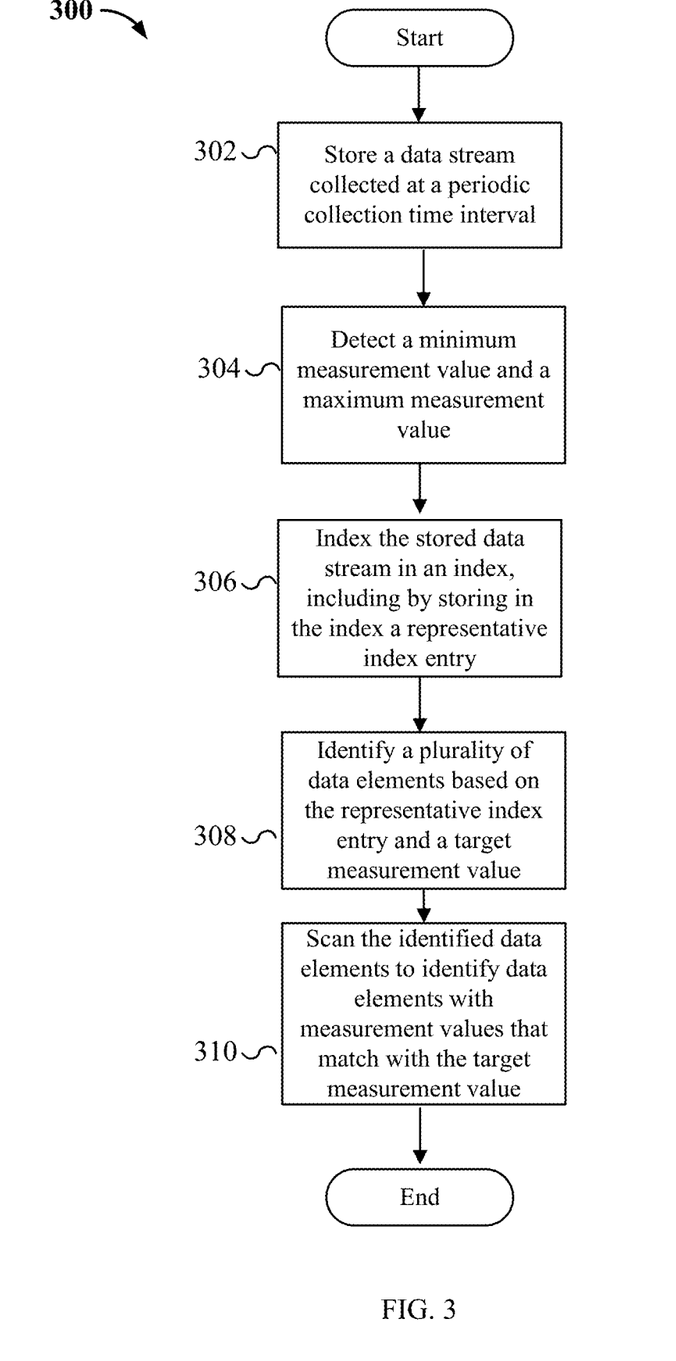
FIG. 3 illustrates an exemplary process 300 for storing and retrieving time-series data in a time-series database.

FIG. 3 illustrates an exemplary process 300 for storing and retrieving time-series data in a time-series database. In some embodiments, process 300 may be performed by time-series database server 102 and time-series database 104.

At step 302, a data stream collected at a periodic collection time interval is stored. The data stream is a time-series data stream. Examples of time-series data include weather records, economic indicators, patient health evolution metrics, server metrics, application performance monitoring metrics, network data, sensor data, events, clicks, and many other types of analytics data. For illustrative purposes only, the example time-series data stream is the data sent from one of a plurality of computers within an enterprise network to report the computer's CPU temperature.

The data stream is collected at a periodic collection time interval, also referred to as a time-series timestamp period. For example, the computer information may be sampled once every minute. The periodic collection time interval of the sampled data points (i.e., sampled data elements) in this example is one minute. Each data element is a single piece of data. Each data element may include one or more measurements. Continuing with the example above, the one or more measurements include a single observation of the computer's CPU temperature.

The received time-series data stream may be stored in a main storage of the time-series database. For example, the time-series data may be stored in a round-robin database (RRD), in which fixed-size records are pre-allocated. A round-robin database is a special type of storage designed to store data in a file or memory-mapped ring buffers. Since the data is stored in a circular buffer-based database, the system storage footprint remains constant over time. However, other types of databases may be used as well.

At step 304, a minimum measurement value and a maximum measurement value of the stored data stream within a window of interest are detected. In some embodiments, the window of interest may be a window with a substantially longer duration than a single data element. In this example, the computer's CPU temperature is sampled once every minute, and the window of interest is set to 30 minutes. Suppose that the computer's minimum measurement and the maximum measurement at some point were 100° F. and 102° F., respectively, and a new measurement and timestamp in the data stream indicates the computer's CPU temperature of 105° F. within the window of interest, then the minimum measurement will remain the same as 100° F. and the maximum temperature is detected to have a new maximum temperature value of 105° F.

At step 306, the stored data stream is indexed in an index, including by storing in the index a representative index entry corresponding to a plurality of data elements of the stored data stream collected during a period of time longer than the periodic collection time interval of the data stream.

To reduce the amount of index writes that are computationally expensive operations, the index does not need to be updated once for each periodic collection time interval. Instead, the index is updated based on a predetermined window of interest. In some embodiments, the predetermined window of interest corresponds to a plurality of data elements of the stored data stream collected during a period of time longer than the periodic collection time interval of the data stream. In some embodiments, the predetermined window of interest may be a window with a substantially longer duration than a single data element. In this example, the computer's CPU temperature is sampled once every minute, and the window of interest is set to 30 minutes.

In some embodiments, updating the index based on the predetermined window of interest comprises storing in the index a representative index entry corresponding to a plurality of data elements of the stored data stream collected during a period of time longer than the periodic collection time interval of the data stream. The representative index entry enables the searching of a measurement value with a granularity of the predetermined window of interest.

In addition, the index is updated when a new minimum or a new maximum temperature in a window occurs in the time-series data. The storing in the index the representative index entry is performed in response to detecting a change in the minimum measurement value or a change in the maximum measurement value. The index stores the minimum and maximum measurements within the window of interest.

At step 308, the plurality of the data elements of the stored data stream collected during the period of time longer than the periodic collection time interval of the data stream is identified based at least in part on the representative index entry and a target measurement value. In some embodiments, the above identification may be based at least in part on the representative index entry and one or more of the following: a target measurement value, a range of measurement values, or an attribute.

Continuing with the above example, the representative index entry may only determine that the CPU temperature ranges from 100° F. to 105° F. between 12:00 pm and 12:30 pm when the predetermined window of interest is from 12:00 pm to 12:30 pm. When searching for a target measurement value of 102° F., the representative index entry may locate the plurality of data elements in the stored data stream, including the data element with the timestamp 12:00 pm, the data element with the timestamp 12:01 pm, and up until the last data element with the timestamp 12:30 pm.

At step 310, the plurality of the data elements of the stored data stream collected during the period of time longer than the periodic collection time interval of the data stream is scanned to identify one or more data elements that match one or more of the following: the target measurement value, the range of measurement values, or the attribute.

Continuing with the above example, each of the identified data elements with timestamps from 12:00 pm to 12:30 pm (with one minute increments) are scanned to identify the data elements that have the target measurement value of 102° F. As shown, to obtain a finer resolution than the resolution of the window of interest requires further scanning of the time-series data within the window of interest.

In some embodiments, additional improved techniques allow efficient storage and indexing of high volume time-series data that includes either metric type information or event type information.

In some traditional time-series databases, the time-series data stored in the databases includes metric type information only. Examples of metric type information include weather records, economic indicators, patient health evolution metrics, server metrics, application performance monitoring metrics, network data, sensor data, and the like. Metrics may be stored as floating point or whole numbers, such as 32 bits floating point or whole numbers or 64 bits floating point or whole numbers.

Time-series data that includes metric type information may be efficiently stored in a round-robin database (RRD), in which fixed-size records are pre-allocated. For example, fixed-size records of floating point numbers may be pre-allocated in a block or a file, such as a block for storing the time-series data collected per minute over 30 days. As the time-series data is received, each new piece of data may be filled into a specific slot of the entire pre-allocated block. There is no need to store the timestamps because the location of the specific slot within the block storing a particular piece of data indicates the corresponding timestamp. Once the fixed-size space allocation is complete, very efficient high speed writing of the time-series data may be achieved. In addition, the location where a particular piece of data for a particular point in time should be read from is known in advance, and there is no need to scan the entire block or file.

However, increasingly, time-series databases may be used in different use cases in which the time-series data involves event type information. Examples of event type information include a computer "on/off" state, whether a computer has a system crash, or whether a computer has overheated, and the like. Unlike time-series data that involves metric type information, which has measurements at each time period, time-series data that involves event type information has relatively rare occurrences. Typically, events are expected to occur infrequently. Events are often sparse data series. The space pre-allocation mechanism of RRD is well suited for dense data series but is extremely wasteful for sparse data series because most of the data positions will contain no data.

Furthermore, events may be represented as either True or False, and therefore events may be efficiently stored in a single bit. A 1-bit represents True, i.e., an event has occurred. A 0-bit represents False, i.e., an event has not occurred. Unlike metrics, events do not have a numeric measurement value.

Therefore, in order to support efficient storage and indexing of high volume time-series data that includes either metric type information or event type information in a common time-series database architecture that utilizes all the improved techniques disclosed above (e.g., process 200 and process 300 disclosed above), the time-series data that includes event type information may be stored in pre-allocated blocks of bits instead of 32 bits floating point numbers.

Figure 4:
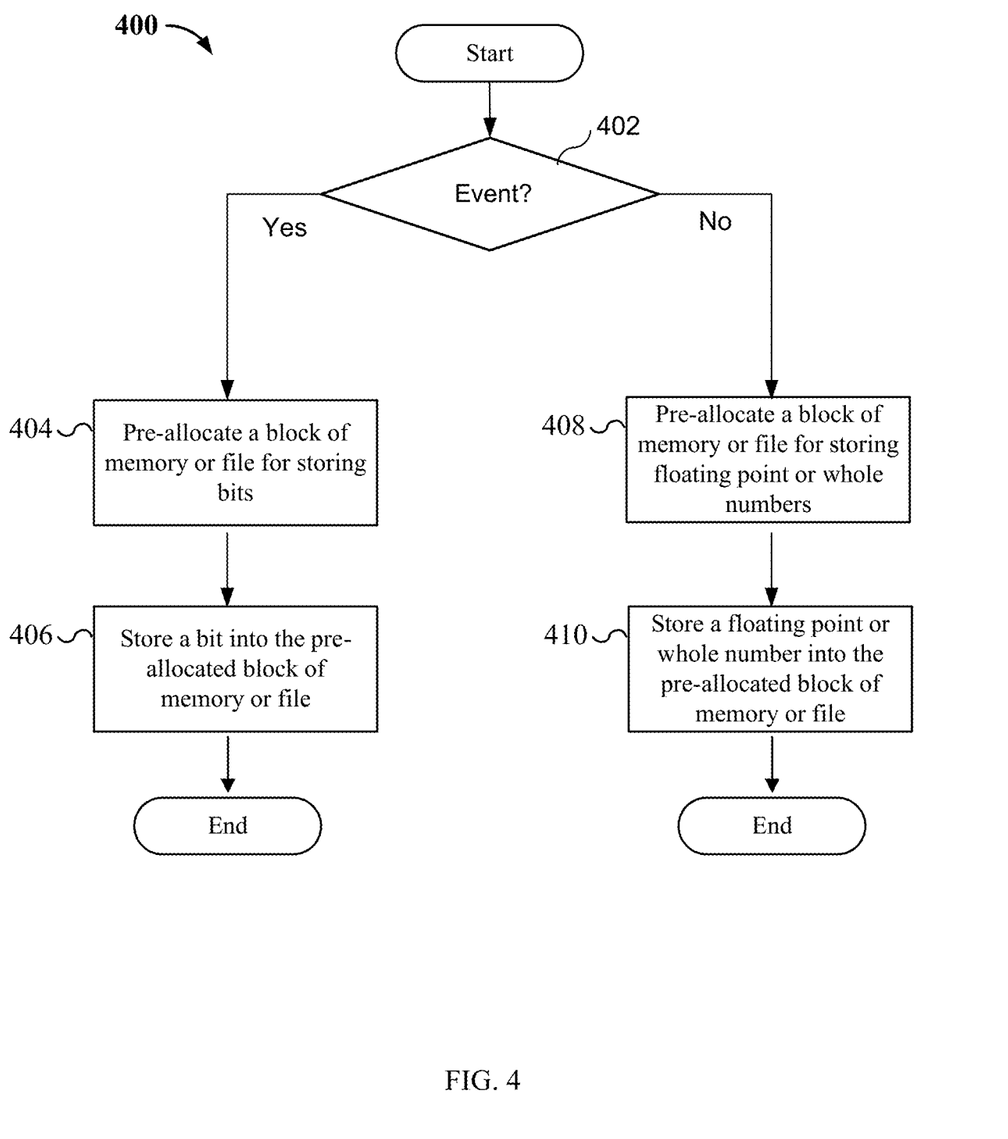
FIG. 4 illustrates an exemplary process 400 for storing time-series data that includes either metric type information or event type information in a common time-series database architecture.

FIG. 4 illustrates an exemplary process 400 for storing time-series data that includes either metric type information or event type information in a common time-series database architecture. In some embodiments, process 400 may be performed at step 202 of process 200 in FIG. 2 or step 302 of process 300 in FIG. 3.

At step 402, it is determined whether the time-series data includes metric type information or event type information. If the time-series data includes event type information, then process 400 proceeds to step 404; otherwise, process 400 proceeds to step 408.

At step 404, a block of memory or file for storing bits is pre-allocated. At step 406, as the time-series data is received, each new piece of data may be filled into a specific slot of the entire pre-allocated block. In particular, an event associated with the new piece of data may be stored as a bit in the pre-allocated block of memory or file. There is no need to store the timestamps because the location of the specific slot within the block storing a particular piece of data indicates the corresponding timestamp.

At step 408, a block of memory or file for storing floating point numbers or whole numbers is pre-allocated. At step 410, as the time-series data is received, each new piece of data may be filled into a specific slot of the entire pre-allocated block. In particular, a metric associated with the new piece of data may be stored as a floating point number or a whole number in the pre-allocated block of memory or file. There is no need to store the timestamps because the location of the specific slot within the block storing a particular piece of data indicates the corresponding timestamp.

Figure 5:
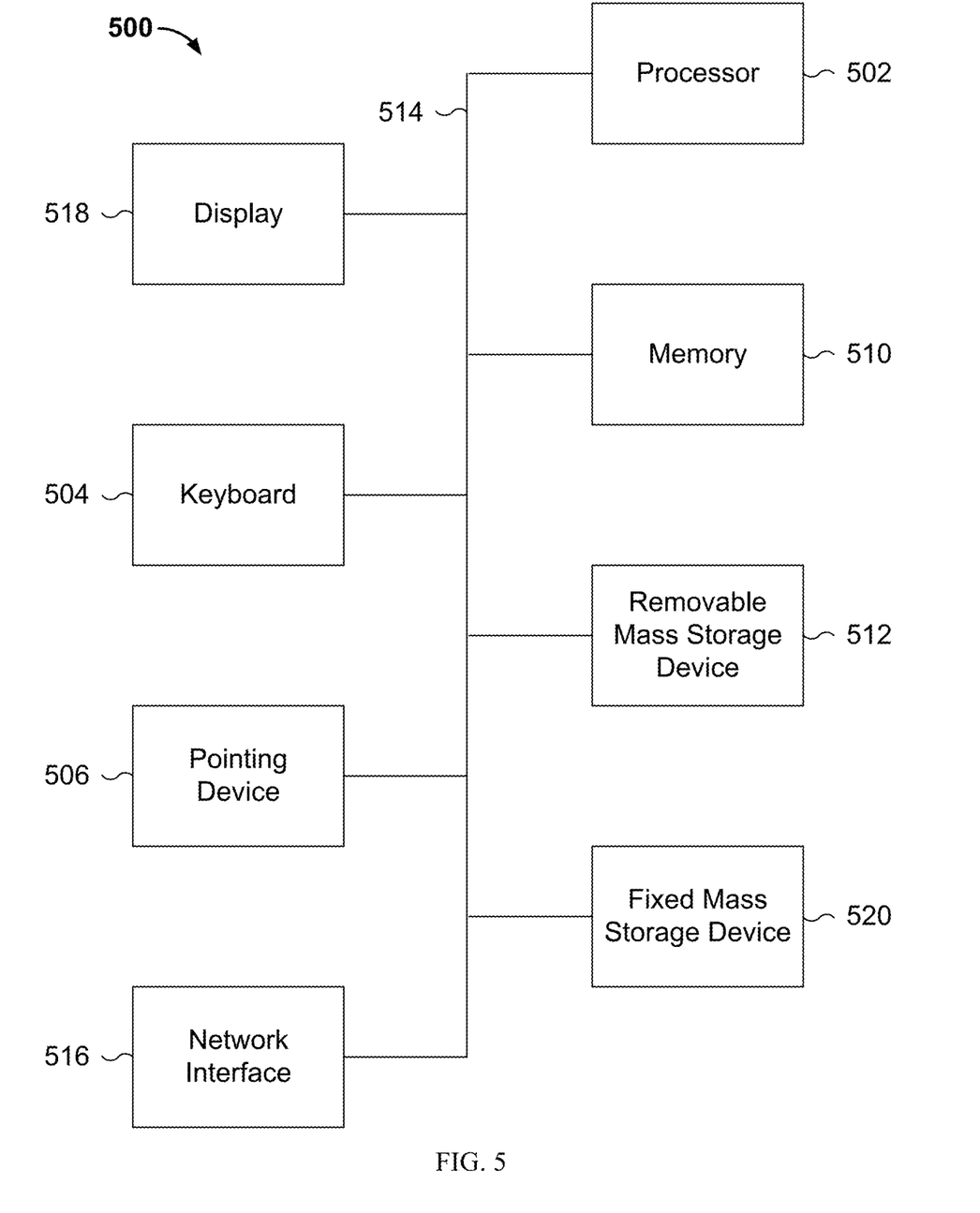
FIG. 5 is a functional diagram illustrating a programmed computer system for executing some of the processes in accordance with some embodiments.

FIG. 5 is a functional diagram illustrating a programmed computer system for executing some of the processes in accordance with some embodiments. As will be apparent, other computer system architectures and configurations can be used as well. Computer system 500, which includes various subsystems as described below, includes at least one microprocessor subsystem (also referred to as a processor or a central processing unit (CPU)) 502. For example, processor 502 can be implemented by a single-chip processor or by multiple processors. In some embodiments, processor 502 is a general purpose digital processor that controls the operation of the computer system 500. Using instructions retrieved from memory 510, the processor 502 controls the reception and manipulation of input data, and the output and display of data on output devices (e.g., display 518). In some embodiments, processor 502 includes and/or is used to execute/perform processes 200, 300, and 400 described above with respect to FIGS. 2-4.

Processor 502 is coupled bi-directionally with memory 510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 502. Also as is well known in the art, primary storage typically includes basic operating instructions, program code, data and objects used by the processor 502 to perform its functions (e.g., programmed instructions). For example, memory 510 can include any suitable computer-readable storage media, described below, depending on whether, for example, data access needs to be bi-directional or uni-directional. For example, processor 502 can also directly and very rapidly retrieve and store frequently needed data in a cache memory (not shown).

A removable mass storage device 512 provides additional data storage capacity for the computer system 500 and is coupled either bi-directionally (read/write) or uni-directionally (read only) to processor 502. For example, storage 512 can also include computer-readable media such as magnetic tape, flash memory, PC-CARDS, portable mass storage devices, holographic storage devices, and other storage devices. A fixed mass storage 520 can also, for example, provide additional data storage capacity. The most common example of mass storage 520 is a hard disk drive. Mass storages 512, 520 generally store additional programming instructions, data, and the like that typically are not in active use by the processor 502. It will be appreciated that the information retained within mass storages 512 and 520 can be incorporated, if needed, in standard fashion as part of memory 510 (e.g., RAM) as virtual memory.

In addition to providing processor 502 access to storage subsystems, bus 514 can also be used to provide access to other subsystems and devices. As shown, these can include a display monitor 518, a network interface 516, a keyboard 504, and a pointing device 506, as well as an auxiliary input/output device interface, a sound card, speakers, and other subsystems as needed. For example, the pointing device 506 can be a mouse, stylus, track ball, or tablet, and is useful for interacting with a graphical user interface.

The network interface 516 allows processor 502 to be coupled to another computer, computer network, or telecommunications network using a network connection as shown. For example, through the network interface 516, the processor 502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502 or can be performed across a network such as the Internet, intranet networks, or local area networks, in conjunction with a remote processor that shares a portion of the processing. Additional mass storage devices (not shown) can also be connected to processor 502 through network interface 516.

An auxiliary I/O device interface (not shown) can be used in conjunction with computer system 500. The auxiliary I/O device interface can include general and customized interfaces that allow the processor 502 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 5 is but an example of a computer system suitable for use with the various embodiments disclosed herein. Other computer systems suitable for such use can include additional or fewer subsystems. In addition, bus 514 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    storing data elements of a data stream in a database, wherein the data elements are collected during a first time interval, and wherein the data elements are stored within the database for a second time interval that is longer than the first time interval;
    indexing the stored data stream in an index, by storing in the index a representative index entry corresponding to a plurality of the data elements of the data stream;
    reducing an amount of index writes by updating the index of the data elements with an index entry corresponding to a set of the data elements that were collected during a third time interval that is longer than the first time interval and shorter than the second time interval, wherein the index entry points to a location in the database storing the set of the data elements;
    receiving a search query identifying at least some of the data elements; and
    in response to the search query, using the index entry to identify the location in the database storing the set of the data elements collected during the third time interval.

2. The method of claim 1, further comprising:
    identifying the set of the data elements that were collected during the third time interval based at least in part on the index entry and one or more of the following: a target measurement value, a range of measurement values, or an attribute.

3. The method of claim 2, further comprising:
    scanning the set of the data elements that were collected during the third time interval to identify one or more data elements that match one or more of the following: the target measurement value, the range of measurement values, or the attribute.

4. The method of claim 1, further comprising:
    detecting a minimum measurement value and a maximum measurement value of the data stream within the third time interval, wherein the index entry is updated in response to detecting a change in the minimum measurement value or a change in the maximum measurement value.

5. The method of claim 4, further comprising:
    storing the minimum measurement value and the maximum measurement value in the index.

6. The method of claim 1, further comprising:
    determining that the data stream includes event type information; and
    in response to determining that the data stream includes the event type information, pre-allocating a block of memory or file for storing bits.

7. The method of claim 6, further comprising:
    in response to determining that the data stream includes the event type information, using a bit to store the event type information in the block of memory or file for storing bits at the first time interval.

8. The method of claim 1, further comprising:
    determining that the data stream includes metric type information; and
    in response to determining that the data stream includes the metric type information, pre-allocating a block of memory or file for storing floating point or whole numbers.

9. The method of claim 8, further comprising:
    in response to determining that the data stream includes the metric type information, using a floating point or whole number to store the metric type information in the block of memory or file at the first time interval.

10. A system, comprising:
    a processor configured to:

store data elements of a data stream in a database, wherein the data elements are collected during a first time interval, and wherein the data elements are stored within the database for a second time interval that is longer than the first time interval;

indexing the stored data stream in an index, by storing in the index a representative index entry corresponding to a plurality of the data elements of the data stream;

reducing an amount of index writes by update the index of the data elements by storing an index entry corresponding to a set of the data elements that were collected during a third time interval that is longer than the first time interval, wherein the index entry points to a location in the database storing the set of the data elements;

receiving a search query identifying at least some of the data elements; and in response to the search query, using the index entry to identify the location in the database storing the set of the data elements collected during the third time interval; and a memory coupled to the processor and configured to provide the processor with instructions.

11. The system of claim 10, wherein the processor is further configured to:

identify the set of the data elements that were collected during the third time interval based at least in part on the index entry and one or more of the following: a target measurement value, a range of measurement values, or an attribute.

12. The system of claim 11, wherein the processor is further configured to:

scan the set of the data elements that were collected during the third time interval to identify one or more data elements that match one or more of the following: the target measurement value, the range of measurement values, or the attribute.

13. The system of claim 10, wherein the processor is further configured to:

detect a minimum measurement value and a maximum measurement value of the data stream within the third time interval, and wherein the index entry is updated in response to detecting a change in the minimum measurement value or a change in the maximum measurement value.

14. The system of claim 13, wherein the processor is further configured to:

store the minimum measurement value and the maximum measurement value in the index.

15. The system of claim 10, wherein the processor is further configured to:

determine that the data stream includes event type information; and in response to determining that the data stream includes the event type information, pre-allocate a block of memory or file for storing bits.

16. The system of claim 15, wherein the processor is further configured to:

in response to determining that the data stream includes the event type information, use a bit to store the event type information in the block of memory or file for storing bits at the first time interval.

17. The system of claim 10, wherein the processor is further configured to:

determining that the data stream includes metric type information; and in response to determining that the data stream includes the metric type information, pre-allocate a block of memory or file for storing floating point or whole numbers.

18. The system of claim 17, wherein the processor is further configured to:

in response to determining that the data stream includes the metric type information, use a floating point or whole number to store the metric type information in the block of memory or file at the first time interval.

19. A computer program product embodied in a non-transitory computer readable medium and comprising computer instructions for:

storing data elements of a data stream in a database, wherein the data elements are collected during a first time interval, and wherein the data elements are stored within the database for a second time interval that is longer than the first time interval;

indexing the stored data stream in an index, by storing in the index a representative index entry corresponding to a plurality of the data elements of the data stream;

reducing an amount of index writes by updating the index of the data elements with an index entry corresponding to a set of the data elements that were collected during a third time interval that is longer than the first time interval and shorter than the second time interval, wherein the index entry points to a location in the database storing the set of the data elements;

receiving a search query identifying at least some of the data elements; and in response to the search query, using the index entry to identify the location in the database storing the set of the data elements collected during the third time interval.

* * * * *